United States Patent [19]

Pepper

[11] Patent Number: 4,703,410
[45] Date of Patent: Oct. 27, 1987

[54] POWER FAILURE INDICATOR

[75] Inventor: Steven H. Pepper, Portland, Oreg.

[73] Assignee: Tektronix, Inc., Beaverton, Oreg.

[21] Appl. No.: 848,660

[22] Filed: Apr. 7, 1986

[51] Int. Cl.$^4$ ............................................. H02H 7/12
[52] U.S. Cl. ....................................... 363/56; 361/91
[58] Field of Search .................................. 361/88–92, 361/56; 363/41, 20, 21

[56] References Cited

U.S. PATENT DOCUMENTS

| | | | |
|---|---|---|---|
| 4,030,015 | 6/1977 | Herko et al. | 363/41 X |
| 4,251,883 | 2/1981 | Grants et al. | 361/92 X |
| 4,291,357 | 9/1981 | Hong | 361/92 X |
| 4,535,399 | 8/1985 | Szepesi | 363/97 X |
| 4,562,522 | 12/1985 | Adams et al. | 361/92 X |

Primary Examiner—A. D. Pellinen
Assistant Examiner—Jeffrey A. Gaffin
Attorney, Agent, or Firm—Mark L. Becker

[57] ABSTRACT

A power failure indicator circuit for a pulse width modulated power supply compares the averaged voltage of the pulse width modulated signal to an input reference voltage to determine if power failure of the supply will occur. The reference voltage corresponds to a predetermined proportion of the maximum average voltage of the pulse width modulated signal. In a preferred embodiment, the pulse width modulated signal is inverted and filtered to generate an averaged signal corresponding to the DC input voltage to the modulator within the pulse width modulated power supply. A comparator compares the averaged signal voltage to the reference voltage to determine if the averaged signal voltage level has fallen below the reference voltage level. If the averaged signal voltage level does drop below the reference voltage level, the comparator generates a signal warning of power failure of the power supply.

7 Claims, 2 Drawing Figures

POWER FAILURE INDICATOR

BACKGROUND OF THE INVENTION

1. Field of the Invention

This invention relates to power failure indicating circuits for power supplies. More particularly, the invention relates to such a circuit for a pulse width modulated power supply.

2. Description of the Prior Art

Electronic test instruments such as oscilloscopes often use logic circuits such as microprocessors in their operation. These circuits store and transmit information to control the instrument and record data obtained by the instrument. It is desirable to preserve much of this information and recorded data when power to the instrument is shut off or is unexpectedly interrupted, such as occurs during a brownout or transient overload conditions. These conditions can arise in a plant, for example, from the continuous switching on and off of central heating and air conditioning systems.

Prior designs for monitoring the operation of a pulse width modulated power supply of an instrument have typically sensed the level of the AC line input voltage into the power supply. When the input voltage level falls below a designated threshold level, a warning signal is transmitted to the logic circuits to allow them to store their information in anticipation of the line voltage falling further and causing a loss of the digital information. The warning signal, however, is often premature because the power supply voltage is maintained temporarily above the falling line voltage by storage capacitors within the supply. Many of the transient conditions of the line voltage are so brief that the storage capacitors are able to maintain a sufficient voltage to ride out the interruption. Monitoring the AC line voltage thus can cause unnecessary shutdowns of the instrument, resulting in costly delay and potential information loss.

Those skilled in the art have recognized this drawback of prior designs but have been unable to avoid it because of the required presence of a galvanic isolation barrier between the pulse width modulated power supply and the internal instrument circuitry to minimize danger to the instrument operator. The DC voltage on the capacitors cannot be sensed directly by internal circuitry because a DC signal cannot cross the galvanic barrier. One technique that avoids the barrier is to optocouple signals from the power supply side of the barrier to the internal circuitry side. Optocoupling circuits, however, are quite expensive and lack needed accuracy and thus impractical for most instruments.

SUMMARY OF THE INVENTION

Therefore, an object of the invention is to provide an improved power failure indicating circuit that warns of power failure of a pulse width modulated power supply only when such failure will occur.

Another object of the invention is to provide such a circuit that utilizes the DC voltage of the power supply to determine an impending power failure.

Another object of the invention is to provide such a circuit that is adjustable to warn of power failure at different input voltage levels of the power supply.

To achieve these objects, a power failure circuit for a pulse width modulated power supply comprises means for averaging the voltage of the pulse width modulated control signal and means for comparing the averaged signal to an input reference voltage source corresponding to a predetermined proportion of the maximum average value of the pulse width modulated signal. If the averaged signal crosses the reference voltage level as the pulse of the modulated signal increases, the comparator means generates a signal warning of power failure of the power supply. The warning enables logic circuits within an instrument powered by the power supply to store their information before actual power failure occurs.

The foregoing and other objects, features, and advantages of the invention will become more apparent from the following detailed description of a preferred embodiment which proceeds with reference to the accompanying drawings.

DETAILED DESCRIPTION

Figure 1:
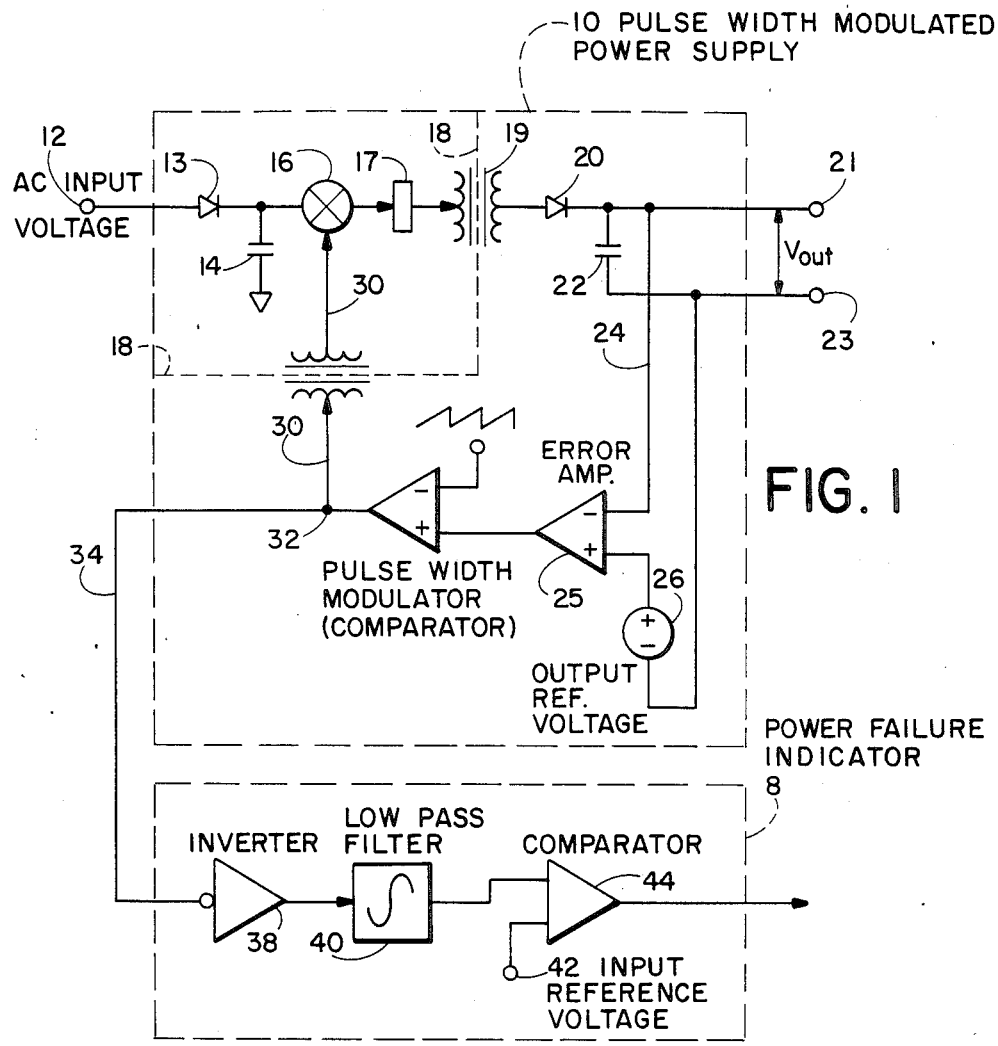
FIG. 1 is a block diagram showing a power failure indicator circuit according to the invention connected to a pulse, width modulator power supply.

FIG. 1 shows a power failure indicator circuit 8 coupled to a conventional pulse width modulated power supply 10 commonly found in electronic test instruments including those instruments that are logic circuit based. To briefly review the operation of the power supply 10, an AC line input voltage applied to an input terminal 12 is rectified to a DC input voltage by rectification means 13. The DC input voltage is applied to storage capacitors 14 which assist in maintaining the DC input voltage level. The DC voltage is then modulated by a pulse width modulator 16 to produce a desired average voltage for the supply. This average voltage produced by the modulation is then routed through an oscillating inverter 17 such as a 50 kilohertz inverter to transmit the voltage across the galvanic isolation barrier 18. The average voltage appears on the opposite side of the barrier 18 to serve as the power supply output voltage $V_{out}$, transformed to the required magnitude by transformer 19 and rectified and filtered by conventional means represented by the diode 20 and capacitor 22. The power supply output voltage thus appears between terminals 21 and 23.

The average voltage to the oscillating inverter 17 and therefore the DC output voltage $V_{out}$ of the power supply 10 are controlled by the modulator 16, which receives a pulse width modulated control signal through a feedback loop that senses the DC output voltage. This loop includes a means such as sense line 24 for sensing the output voltage of the power supply 10 and routing the sensed voltage to an error amplifier circuit 25. The amplifier circuit 25 compares the DC output voltage $V_{out}$ present at the inverting input terminal of circuit 25 to the voltage of a reference source 26 present at the noninverting input terminal and generates an error signal in response to a voltage difference. The error signal is transmitted to a signal generating means such as a comparator 28 in communication with the amplifier circuitry 25. The comparator 28 compares the error signal present at the noninverting input terminal of a comparator 28 to a sawtooth signal from a ramp voltage source 29 present at the inverting input terminal and generates as an output the pulse width modulated control signal, the width of the pulse depending on the voltage level of the error signal. For example, a positive error signal that results from an output voltage lower than the reference voltage of source 26 causes the comparator 28 to increase the pulse width of the control signal. This control signal is then fed back across the isolation barrier 18 via a path 30 to the modulator 16.

The pulse width of the modulated control signal from the comparator 28 thus controls the output voltage $V_{out}$ of the power supply 10. If the AC line input voltage drops, the width of the modulated signal increases, thereby maintaining a constant average voltage at the modulator 16 and an average $V_{out}$. $V_{out}$ is sensed in feedback to determine if it matches the voltage of the output reference voltage source 26. The width of the modulated signal is adjusted accordingly by amplifier circuitry 25 and the comparator 28.

The power failure indicator circuit 8 is connected to the power supply 10 at a node 32 between the output terminal of the comparator 28 and the feedback path 30. A path 34 from the circuit 8 connects to node 32 to transmit the modulated signal to an inverter 38. The modulated signal is inverted and routed through a low-pass filter 40 to average the inverted signal to a substantially DC voltage. The voltage of the averaged signal is compared to the voltage of an input reference voltage source 42 at a comparator 44.

The averaged inverted signal corresponds to the level of the DC input voltage, the inverted signal tracking the DC input voltage as it changes. The input reference voltage source 42 is set at a predetermined proportion of the average voltage at the modulator 16. The averaged inverted signal and reference voltages are then compared to determine if the averaged inverted signal voltage has dropped below the reference voltage level. The comparator 44 will generate in response to such a determination a signal warning of power failure of the power supply 10. The warning signal is routed to the instrument logic circuits 45 to enable the circuits to store their information before actual power failure occurs.

It should be understood that the inverter 38 is shown for illustration only and that the invention does not require inverting the pulse width modulated signal before comparing its averaged voltage to a input reference voltage. The pulse width modulated signal itself may be averaged and compared with an input reference voltage that represents a greater proportion of the maximum average voltage of the pulse width modulated signal, such as 90%. If the averaged voltage of the modulated signal rises above the reference level, the comparator 44 generates a signal warning the failure of the power supply will occur. On the other hand, if the signal is inverted as disclosed in FIG. 1, the input reference source is set at a lower proportion of the maximum average voltage of the pulse width modulated signal, such as 10%. If the averaged voltage of the inverted modulated signal drops below the reference level, the comparator 44 generates the warning signal.

Figure 2:
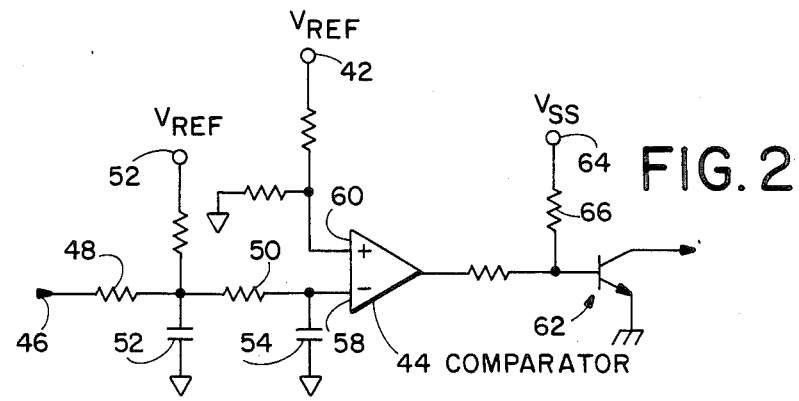
FIG. 2 is a circuit diagram of the power failure indicator circuit of FIG. 1.

FIG. 2 shows a detailed embodiment of the power failure indicator circuit 8. The inverted modulated signal from the inverter 38 is applied to an input end 46. The inverted signal is then averaged by the low-pass filter 40 comprising series resistors 48, 50 and capacitors 52, 54. The voltage level of the averaged signal is shifted by summing it with a reference voltage 52. The averaged signal is then applied to the inverting input terminal 58 of the comparator 44 for comparison against the reference voltage 42 applied to the noninverting input terminal 60. If the averaged signal drops below the reference level, the comparator 44 generates an output signal that renders a transistor 62 conductive by diverting current produced by a voltage source 64 and resistor 66 from the comparator to the base-emitter junction of the transistor. The transistor 62 translates the output signal of comparator 44 into a logic-compatible warning signal at its collector. The warning signal is true when low. Collector pull-up (not shown) is provided by the instrument, appropriate to the type of logic used.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. In a pulse width modulated power supply controlled by a pulse width modulated signal having a time varying voltage, a power failure indicator circuit comprising:

averaging means for averaging the time varying voltage of the pulse width modulated signal to produce an averaged signal voltage;

an input reference voltage source for providing a reference voltage corresponding to a predetermined proportion of a maximum average voltage of the pulse width modulated signal; and comparator means for comparing the averaged signal voltage to the reference voltage to determine if the averaged signal voltage level has crossed the reference voltage level and generating in response to such a determination an output signal warning of power failure of the power supply.

2. The indicator circuit of claim 1 in which the averaging means comprises a low-pass filter for passing the DC component of the signal voltage.

3. The indicator circuit of claim 1 including an inverter means for inverting the pulse width modulated signal, the comparator means comparing the averaged inverted signal voltage to the input reference voltage to determine if the averaged inverted signal voltage level has fallen below the input reference voltage level.

4. In a pulse width modulated power supply having an input voltage and providing an output voltage, the power supply controlled by a pulse width modulated signal having a time varying voltage, a power failure indicator circuit comprising:

voltage sense means for sensing the output voltage of the power supply;

an output reference voltage source;

an error amplifier for sensing a voltage difference between the reference voltage and the output voltage and generating in response to such a difference an error signal;

modulated signal generating means in communication with the error amplifier for generating the pulse width modulated signal in response to the error signal;

an inverter means for inverting the pulse width modulated signal;

a low-pass filter for passing the DC component of the pulse width modulated signal voltage to produce an averaged signal voltage;

an input reference voltage source for providing a reference voltage corresponding to a predetermined proportion of a maximum average voltage of the pulse width modulated signal; and a comparator for comparing the averaged inverted signal voltage to the reference voltage to determine if the averaged signal voltage level has crossed the reference voltage level and generating in response to such a determination a signal warning of power failure of the power supply.

5. In a pulse width modulated power supply receiving an input voltage and providing an output voltage, the power supply controlled by pulse width modulated signal having a time varying voltage, a method of warning of power failure comprising:

averaging the time varying voltage of the pulse width modulated signal to produce an averaged signal voltage;

providing a reference voltage corresponding to a predetermined proportion of a maximum average voltage of the pulse width modulated signal;

comparing the averaged signal voltage to the reference voltage to determine if the averaged signal voltage level has crossed the reference voltage level; and generating in response to such a determination a signal warning of power failure of the supply.

6. The method of claim 5 in which averaging the pulse width modulated signal and comparing it to the reference signal comprises:

inverting the pulse width modulated signal;

averaging the voltage of the inverted signal; and comparing the averaged inverted signal voltage to the reference voltage to determine if the averaged inverted signal voltage level has fallen below the reference voltage level.

7. The method of claim 5 in which averaging the voltage of the pulse width modulated signal comprises passing the modulated signal through a low-pass filter to extract the DC component of the signal.

* * * * *